United States Patent [15] 3,701,107

Williams [45] Oct. 24, 1972

[54] COMPUTER WITH PROBABILITY MEANS TO TRANSFER PAGES FROM LARGE MEMORY TO FAST MEMORY

[72] Inventor: John Garland Williams, Princeton, N.J.

[73] Assignee: RCA Corporation

[22] Filed: Oct. 1, 1970

[21] Appl. No.: 77,141

[52] U.S. Cl. ............................................ 340/172.5
[51] Int. Cl. ............................................ G06f 7/00
[58] Field of Search .................................. 340/172.5

[56] References Cited

UNITED STATES PATENTS

| | | | |
|---|---|---|---|
| 3,248,708 | 4/1966 | Haynes | 340/172.5 |
| 3,525,985 | 8/1970 | Melliar-Smith | 340/172.5 |
| 3,535,697 | 10/1970 | Melliar-Smith | 340/172.5 |
| 3,569,938 | 3/1971 | Eden | 340/172.5 |

*Primary Examiner*—Harvey E. Springborn
*Attorney*—H. Christoffersen

[57] ABSTRACT

A computer system includes a relatively fast, small, random-access memory, and a large, relatively slow, directly-addressable, random-access memory. An address comparator is receptive to the contents of a real address register and has a first output indicating that the desired word is stored in the fast memory, so that the contents of the real address register can be used to address the fast memory. The address comparator has a second output indicating that the desired word is in the large memory. In this second case, the contents of the real address register is used to directly address the large memory a majority of the time, under control of a random probability device. The remaining small proportion of the time, the computer is interrupted and caused to transfer a page of memory words, including the desired word, from the large memory to the fast memory.

9 Claims, 1 Drawing Figure

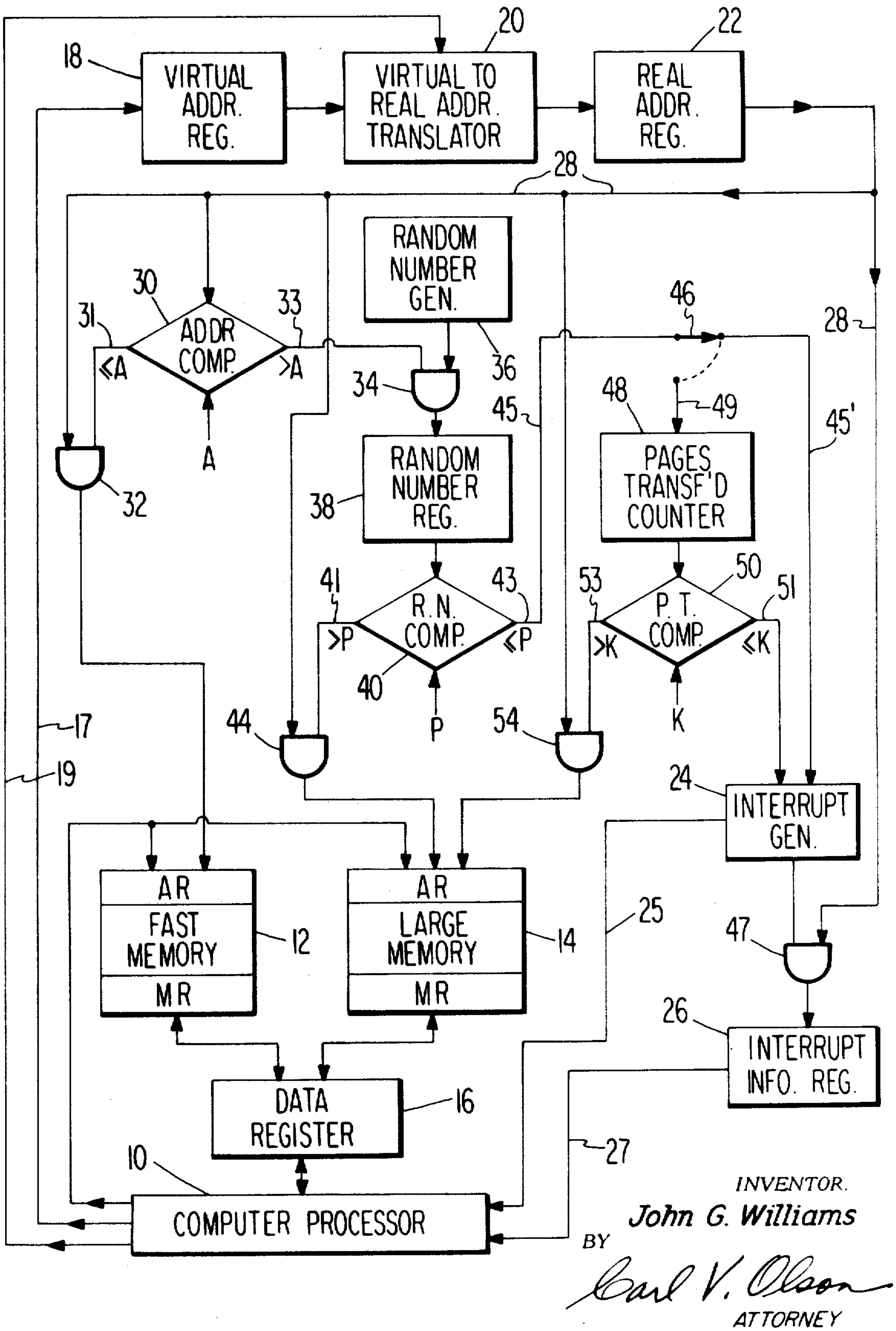
INVENTOR.
John G. Williams
BY
Carl V. Olson
ATTORNEY

COMPUTER WITH PROBABILITY MEANS TO TRANSFER PAGES FROM LARGE MEMORY TO FAST MEMORY

BACKGROUND OF THE INVENTION

Computer systems are often constructed to include a random-access magnetic core main memory and one or more large-capacity magnetic drum, disc or tape peripheral memories. Only the magnetic core memory is directly addressable by the computer processor, and information in the peripheral memories must be transferred to the magnetic core memory before it can be used by the processor.

Since the directly-addressable magnetic core main memory cannot be made as large as is desired without a speed and cost penalty, it has been proposed to include in the memory hierarchy a directly-addressable magnetic core memory which is large, slow and relatively inexpensive per unit of stored information. The computer processor can directly address information in the fast, small, magnetic core memory, or in the large, slow, magnetic core memory. It is then desirable to have the most frequently used information in the fast memory, and the least frequently used information in the large memory.

SUMMARY OF THE INVENTION

Means are provided for transferring pages of information from a large memory to a fast memory according to a scheme such that there is an improved probability that the transferred pages will contain information frequently needed by the processor. This is accomplished under control of a random probability device. A desired word is normally found to be in the fast small memory. However, when a desired word is in the large memory, the random probability device usually decides to allow a direct addressing of the word in the large memory, and occasionally decides to cause the page containing the desired word to be transferred to the fast memory.

BRIEF DESCRIPTION OF THE DRAWING

The sole FIGURE of the drawing is a diagram of a computer system constructed according to the teachings of the invention.

DESCRIPTION OF THE PREFERRED EMBODIMENT

The sole FIGURE of the drawing shows a computer system including a computer central processor 10, a relatively fast, small, random-access memory 12 and a large, relatively-slow, directly-addressable, random-access memory 14. The fast memory 12 and the large memory 14 each include an address register AR and a memory data register MR. A data register 16, which may be an element in the processor 10, is provided for data transferred between the processor 10 and the memory registers of memories 12 and 14. Both memories may be magnetic memories such as magnetic core memories. Alternatively, the fast memory may be a semiconductor memory.

The computer processor 10 is a page-oriented machine which deals with virtual memory addresses supplied over line 17 to a virtual address register 18. The contents of the virtual address register 18 are applied to a translator 20 which translates the virtual memory address to a real or actual memory address which is supplied to register 22. The contents of the real address register 22 are an address in one or the other of the memories 12, 14. The described system permits the execution of programs using virtual memory addresses which do not identify the real or actual storage locations in the two memories. The translator 20 automatically translates virtual addresses to the real addresses employed to most efficiently utilize the fast memory 12 and the large memory 14. Facilities for handling virtual and real addresses are normally included in computer systems of the time-sharing type. The facilities normally are constructed to permit the transfer of page units of memory information, a word at a time, between a fast memory and a large memory. This is accomplished by a conventional interrupt system which includes an interrupt flag generator and register 26. The computer system may, for example, be an IBM System/360 Model 67 computer equipped with both the standard high speed main memory and the IBM Model 2361 large-capacity auxiliary core memory. A description of such a system in use is given by R.E. Fikes et al. in the paper "Steps Towards a General Purpose Time-Sharing System Using Large Capacity Storage and TSS/360" appearing in the Proceedings of the 1968 National Conference of the Association for Computing Machinery.

The contents of the real address register 22 are applied over a real address bus 28 to an address comparator 30. The comparator may, for example, be as described in U.S. Pat. No. 3,166,733, issued on Jan. 19, 1965 to R.H. Shuman on "Number Comparing Systems." The comparator 30 has another input A which represents the dividing line between the address locations in fast memory 12 and the address locations in large memory 14. The input A is a number equal to the highest address of storage locations in fast memory 12. All addresses of storage locations in large memory 14 are numbers higher than A. If the address supplied to comparator 30 is less than or equal to A, the output 31 of the comparator enables gate 32 to pass the address therethrough to the address register AR of fast memory 12. The transfer of pages is performed because of the desire to have the most frequently used information in the small fast memory. The desired word storage location is thus addressed for the purpose of transferring an information word from the memory through the memory register MR and the data register 16 to the processor 10, or from the processor 10 to the addressed storage location in the memory.

On the other hand, if the real address supplied from bus 28 to the comparator 30 is greater than A, the output 33 of the comparator enables a gate 34. The gate 34, when enabled, passes a momentarily-present random number from a random number generator 36 to a random number register 38. The random number generator may, for example, be constructed according to U.S. Pat. No. 3,124,753 issued on Mar. 10, 1964, to L.P. Gieseler on a "Method and Apparatus for Producing Random Numbers Employing Plural Generators Having Different Repetition Rates." The contents of the random number register 38 are applied to a random number comparator 40, which also has an input P. The input P is a probability number which is compared with the random number to make a random, statistical, probability decision. That is, the comparator 40 provides an output at 41 when the random number is greater than P and provides an output at 43 when the random number is equal to or less than P. The value of P is selected so that the great majority of the random numbers are greater than P, and the few remaining random numbers are less than or equal to P. The value of P may be selected in relation to the number of different random numbers such that the output 43 of comparator 40 is energized, on the average, once every 2,500 times, and the output 41 is energized 2,499/2,500 of the time, for example. To summarize, the random number generator 36, the gate 34, the random number register 38 and the random number comparator 40 constitute a random probability device having a first output 43 which is energized a small proportion of the time and a second output 41 is energized the remaining major portion of the time. When the output 41 of comparator 40 is energized, as is most frequently the case, a gate 44 is enabled to cause the transfer of the real address on bus 28 to the address register AR of the large memory 14. An information word is then transferred between the addressed storage location in memory 14 and the computer processor 10.

If the output 43 of comparator 40 is energized, as it infrequently is, the signal is applied over line 45, through switch 46, and over line 45' to the interrupt generator 24. Switch 46 may be an electronic switch operated under program control. The interrupt generator 24 signals the processor over line 25 to initiate and perform a transfer of a page of information from the large memory 14 to the fast memory 12. The particular page of information transferred is the page including the memory word identified by the real address on bus 28. This real address is supplied through gate 47, when enabled by the interrupt generator 24, to an interrupt information register 26. The contents of register 26 are made available to the processor over lines 27. After the processor 10 completes the transfer of a page to the fast memory 12, the processor acts over line 19 to modify a table in the virtual to real address translator 20 to reflect the changed real address of the transferred page of information.

When it is desired to limit the number of pages which can be transferred to the fast memory 12, a counter 48 and a comparator 50 are connected into the system by means of a switch 46. In this case, the energization of output 43 of comparator 40 acts over line 49 to cause an advancement of the pages-transferred counter 48. The count in counter 48 is compared with a predetermined maximum number K in comparator 50 to determine whether a page transfer will be permitted. The value of K may be selected so that page transfers are no longer permitted after 50 percent, or 60 percent, for example, of the pages in large memory 14 have been transferred to fast memory 12. If the number from counter 48 is equal to or less than K, the output 51 of comparator 50 is energized and causes the interrupt system to operate in the manner that has been described. On the other hand, if the output 53 of comparator 50 is energized, indicating that the counter has reached a count greater than K, the gate 54 is enabled to cause the real address on bus 28 to pass to the address register AR of large memory 14.

OPERATION

In the operation of the described system, it is assumed that a program to be executed is initially located in the large memory 14. The processor 10 in executing the instructions of the program successively applies addresses over lines 17 to the virtual address register 18. The tables in the translator 20 initially record the fact that all real addresses are in the large memory 14. Therefore, the initial virtual addresses from register 18 are translated by translator 20 to real addresses which are supplied through register 22 to bus 28. The address comparator 30 determines that the initial real addresses are in the large memory 14, and accordingly a random number is gated from generator 36 through gate 34 and register 38 to the random number comparator 40. The comparator 40 operates in a random manner to almost always provide an output at 41 which enables gate 44 and passes the real address to the address register AR of the large memory 14. The fraction of the time that this occurs, on the average, may be every time but once in 2,500 accesses, or every time but once in 10,000 accesses, for example.

The probability figure of once in every several thousand accesses may, for example, be determined from the fraction: 100 divided by the total number of addressing references made during the execution of the program. In a study of four computer programs it was found that there were from about 300,000 to 3 million memory accesses in the execution of the programs studied. Therefore, a considerable number of direct accesses are initially made to the large memory 14 before an accessing results in a signal at output 43 of comparator 40 which stimulates a computer interrupt and the transfer of an entire page including the desired memory word from the large memory 14 to the fast memory 12. The translator 20 is then modified to reflect the fact that the real address of the transferred page is an address in the fast memory 12.

Thereafter, as memory accesses are made, it may be that a memory word to be accessed is present in the fast memory 12. When this is the case, the address comparator 30 enables gate 32 and directs the address to the fast memory 12. Subsequently, the comparator 30 will encounter an address in large memory 14 which results in the transfer of another page from large memory 14 to fast memory 12. It is then somewhat more probable that a future memory address will be located in fast memory 12 and can therefore be speedily executed.

When a typical computer program is run on a page-oriented system, it has been found that 50 percent of the pages account for about 95 percent of the memory accesses, and that the remaining 50 percent of the pages account for only about 5 percent of the accesses. Therefore, if the most active 50 percent of the pages are located in fast memory 12, the computer can operate 95 percent of the time at the high speed rate of the fast memory 12. However, the 50 percent of the pages which are most active cannot be determined for an infrequently-run program by any convenient or economical means.

The present invention is based on a study of the statistical properties of page activity, that is, a study of the statistical probability that a desired memory word is in the same page as a previously-accessed word. It has been found that the system described herein, when used on four typical programs, resulted in 50 percent of the pages being transferred and resulted in 80 percent of the addressing references being made to the fast memory 12 during the course of execution of a program. If 50 percent of the pages were arbitrarily transferred from large memory to fast memory, it would be expected that only 50 percent of the memory addressing references would be made to the fast memory 12. Therefore, the present system results in 80 percent of the addressing references being made to fast memory, compared with 50 percent with an arbitrary transfer, and compares favorably with the theoretical maximum of 95 percent when the fast memory contains the 50 percent of the pages which are known to be the most-active pages. Stated another way, the described system may be said to have about (80–50)/(95–50) or two-thirds as effective as a page location system can possibly be.

When the maximum number of pages that can be transferred from the large memory 14 to the fast memory 12 is limited by operation of the comparator 50 to a maximum of 60 percent of the pages, a typical program results in the transferring of about 45 percent of the pages to fast memory 12 with the result that about 77 percent of all memory addressing references are made to the fast memory 12. The use of the pages transferred counter 48 and the comparator 50 is desirable when it is necessary to limit the number of pages residing in the fast memory 12. This added feature is obtained with only a slight degradation in the performance achieved.

In practicing the invention there are a number of factors to be considered in maximizing the performance of the system. The relative sizes and relative speeds of the fast memory 12 and the large memory 14 are important in determining the probability factor P to be employed. Also, consideration should be given to the time and programming overhead required to transfer a page from the large memory 14 to the fast memory 12, since this transfer is made one word at a time. Another factor to be considered is the number of memory words included in each memory page.

The comparators 30, 40 and 50 each may be constructed in the form of a register having a decoder with input connections to the stages of the register and with two outputs. The decoder is constructed in accordance with the appropriate comparison constant, A, P or K, to provide energization of one or the other of the comparator outputs depending on the contents of the comparator register. Alternatively, a construction may be used in which the constants, particularly the constants P and K, are variable and under control of the programmer.

What is claimed is:

1. In a computer system in which memory words are grouped in pages of memory words, a relatively fast, small random-access memory, a large, relatively slow, directly-addressable, random-access memory, means to determine whether a desired memory word is located in the fast memory or the large memory, first means operative when the desired memory word is located in the fast memory to directly address the fast memory, and second means operative when the desired memory word is located in the large memory to directly address the large memory a large percentage of the time and which includes means to transfer a page of memory words including the desired word from the large memory to the fast memory a remaining small percentage of the time.

2. The combination as defined in claim 1 wherein said second means includes a random probability means for making each decision to directly address the large memory or to transfer a page from the large memory to the fast memory in a random manner, rather than in a predetermined manner.

3. The combination as defined in claim 2 wherein said random probability means includes a random number source and means to compare the magnitude of the number from the source with a predetermined number.

4. The combination as defined in claim 1 wherein said second means includes a random number source and means to determine whether a random number from said source is greater or less than a predetermined value.

5. The combination as defined in claim 1, and in addition, means to limit the maximum number of pages which can be transferred from the large memory to the fast memory.

6. In a computer system in which memory words are grouped in pages of words, the combination of a fast, small random-access memory, a large slow directly-addressable, random-access memory, a real address register for the address of a memory word to be accessed from either one of said memories, an address comparator receptive to the contents of said real address register and having a first output indicating a storage location in said fast memory, and having a second output representing a storage location in said large memory, means responsive to said first output of said address comparator to employ the contents of said real address register to address the fast memory, a probability means having a first output which is energized a very large proportion of the time and a second output which is energized the remaining small proportion of the time, means responsive to said second output of said address comparator and the first output of said probability means to employ the contents of said real address register to address the large memory, and means responsive to said second output of said probability means and the contents of said real address register to interrupt the computer and cause a transfer from the large memory to the fast memory of a page of memory words including the memory word specified by the contents of said real address register.

7. A system as defined in claim 6 wherein said probability means is a random probability device for making each decision to directly address the large memory or to transfer a page from the large memory to the fast memory in a random manner.

8. A system as defined in claim 7 wherein said probability device includes a random number source and means to determine whether a random number from said source is greater or less than a predetermined value.

9. A system as defined in claim 6, and in addition, means to limit the maximum number of pages that can be transferred to the fast memory.

* * * * *